Figure 4:
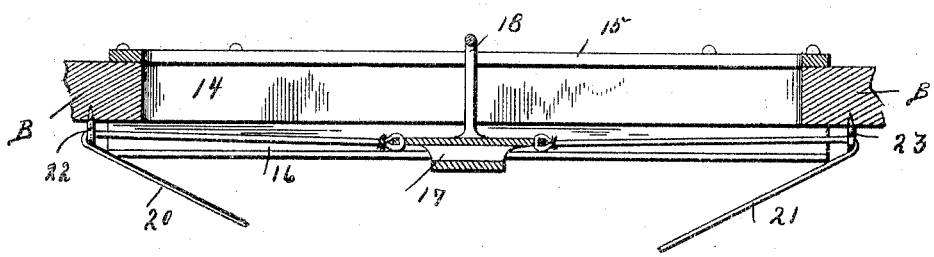

No. 783,512. PATENTED FEB. 28, 1905.
E. B. FINCH.
SPEED AND TIME REGULATING DEVICE FOR USE UPON SOUND REPRODUCING
MACHINES.
APPLICATION FILED MAY 3, 1904.
2 SHEETS—SHEET 1.
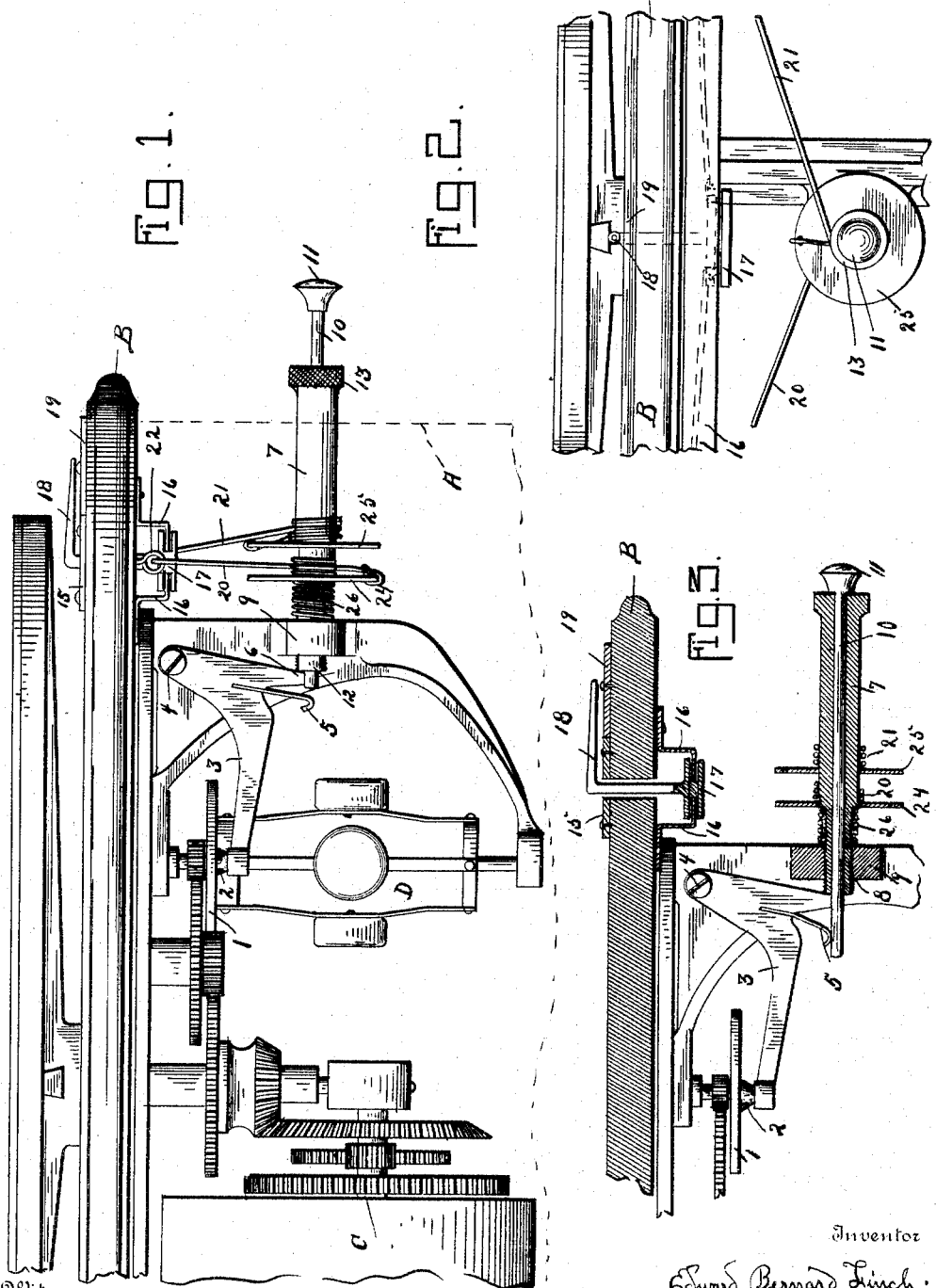
Witnesses
Inventor
Edward Bernard Finch
By
David P. Moore,
Attorney No. 783,512. PATENTED FEB. 28, 1905.
E. B. FINCH.
SPEED AND TIME REGULATING DEVICE FOR USE UPON SOUND REPRODUCING MACHINES.
APPLICATION FILED MAY 3, 1904.

2 SHEETS—SHEET 2.

Witnesses
Inventor
Edward Bernard Finch
By David P. Moore.
Attorney

No. 783,512.　　　　　　　　　　　　　　　　　　　　　Patented February 28, 1905.

UNITED STATES PATENT OFFICE.

EDWARD BERNARD FINCH, OF WASHINGTON, DISTRICT OF COLUMBIA.

SPEED AND TIME REGULATING DEVICE FOR USE UPON SOUND-REPRODUCING MACHINES.

SPECIFICATION forming part of Letters Patent No. 783,512, dated February 28, 1905.

Application filed May 3, 1904. Serial No. 206,167.

*To all whom it may concern:*

Be it known that I, EDWARD BERNARD FINCH, a citizen of the United States, residing at Washington, in the District of Columbia, have invented certain new and useful Improvements in Speed and Time Regulating Devices for Use upon Sound-Reproducing Machines, of which the following is a specification.

My present invention relates to improvements in speed and time regulating devices for use upon sound-reproducing machines; and the main object of my invention is the provision of a mechanism whereby sounds can be reproduced from a record in the same rate of speed as the same was recorded thereon, this being accomplished by means of a novel mechanism operably connected with the governing mechanism of the sound-reproducing machine.

It has therefore been my object to produce a simple mechanism which is readily controllable from the outside of the machine and which is provided with an indicator for indicating the rate of speed at which the record should be operated, the said time-setting mechanism being operated before the mechanism is set in operation, so that there is none of the disagreeable sounds or the guesswork of allowing the record to be revolved or rotated, and as the same is being revolved or rotated adjust the governing mechanism, so as to finally secure the proper rate of speed at which the record should be played. All that is absolutely necessary in connection with my mechanism is that when recording the music should be played in the proper tempo in which it is written, the said tempo being stamped upon the record, so that when placed upon a machine upon which my device is used all that is necessary is to operate the indicator so as to point to the proper figures representing the tempo indicated on the record, thus causing the mechanism of the machine to reproduce the music or sounds in the exact tempo in which it is recorded.

In putting my invention into practice I have found it readily applicable to any of the machines now in use, but preferably use it in connection with the disk-machines, the indicating device in this case slightly projecting through the upper surface of the machine, so as to be observable near the periphery of the disk-support and be always in a position to be readily seen and quickly manipulated so as to indicate the time at which the regulating mechanism is set, the said regulating mechanism being directly operably connected with the indicating mechanism.

To attain these objects, the invention consists of a speed and time regulating and indicating mechanism embodying novel features of construction and combination of parts, substantially as disclosed herein.

Figure 5:
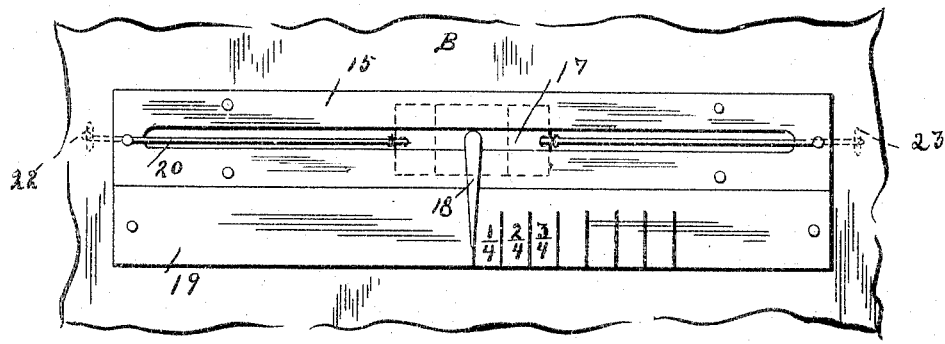
Figure 6:
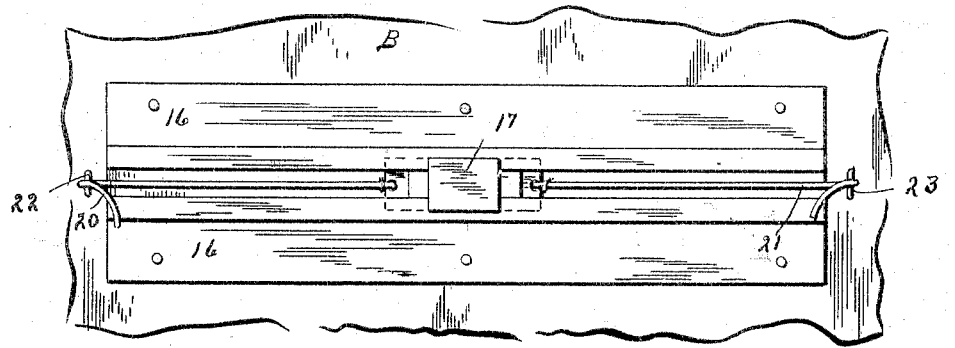

In the accompanying drawings, Figure 1 is a side elevation of the operating and governing mechanism and disk sound-reproducing means with my device in operable connection therewith, the starting and stopping pin being in the position it assumes when the machine is in motion. Fig. 2 is an end view of a portion thereof. Fig. 3 is a longitudinal sectional view taken through the starting and stopping mechanism and my speed-regulating mechanism, showing how the indicating mechanism is connected therewith, the starting and stopping pin being in the position it assumes when holding the mechanisms in an immovable position. Fig. 4 is a cross-section through the indicating mechanism's slot or frame. Fig. 5 is a top plan view thereof, and Fig. 6 is a bottom plan view thereof.

Referring to the drawings, A designates the case of a sound-reproducing machine, provided with a hinged top or mechanism support B, which has mounted below the operating mechanism C and the governor mechanism D a vertical shaft E, being connected with both of said mechanisms, whereby the disk-support is properly carried.

The governing mechanism is provided with the brake plate or disk 1, which is adapted to have in contact therewith the brake-shoe 2, carried by the curved arm 3 of the pivoted lever 4, which is provided with a spring-plate 5 and the stop or lug 6. Adapted to control the movement of this lever and regulate its tension, so as to regulate the speed of the governor, and thereby the speed and time of the record, is a rotatable sleeve 7, whose threaded end 8 is mounted in the threaded lug 9 of the governor-supporting frame, and slidingly mounted within said sleeve and projecting through the casing from the outside is the starting and stopping pin 10, whose reduced end is adapted to pass through the slot in the lower end of the lug or stop and engage the lower end of the spring-plate of the brake, and thereby hold the brake-shoe in contact with the brake-disk of the governor mechanism and lock the mechanism against movement. The spring-plate 5 is of such a strength and length as to project down below the inner reduced end of the stopping and starting pin 10 and when in such position allows the brake-shoe 2 to be released from engagement with the brake plate or disk 1, thus allowing the mechanism to revolve; but as the stopping and starting pin is pushed inward the end of the spring-plate 5 contacts the upper surface of the stopping and starting pin 10 and bears down upon the same, holding the brake-shoe 2 in close contact with the disk 1 and exerting such a tension upon the pin 10 as to hold it stationary in such position, the same forming a lock for the pin 10 and also for the brake-shoe 2 and disk 1. It will therefore be seen that this construction of spring will hold the push-pin 10 securely in place when the pin is in its inmost position or when the governing and operating mechanisms are out of operation or stopped. When it is desired to start the mechanism, it is simply necessary to pull upon the head 11 of the starting and stopping pin, so as to release the same from engagement with the spring-plate, thus reducing the friction between the brake-shoe and brake-disk and allowing the operating mechanism to be set in motion. In order to control the speed more exactly, the rotatable sleeve is revolved so that its inner end 12 will contact the outer face of the stop or lug of the brake, and thereby hold the brake-shoe and brake-disk in frictional contact, so as to allow the speed of the governor to be increased or decreased according to the time at which the record should be reproduced. In order to rotate this sleeve from the exterior of the machine, the milled head or wheel 13 is provided. This much of the invention relates to the speed and time regulating mechanism; but in order that the same may be indicated exteriorly of the machine and the same quickly and properly set I provide through the cover of the machine a longitudinal slot 14, which is covered by means of the slotted plate 15, and upon the bottom of the cover and in alinement with the slot therethrough I provide the two guide-plates 16, in which is adapted to slide the carriage or block 17, to which the indicator 18 is rigidly connected, so that its point, which is exterior of the top, will be adapted to be reciprocated within the slot so as to indicate the various times which are printed or shown upon the scale-indicating plate 19, secured upon the upper face of the cover of the machine.

In order to reciprocate the indicator carriage or block, I provide the two flexible connections 20 and 21, whose ends are connected to the block at opposite sides by being passed through and over the end pulleys 22 and 23. The opposite end of the flexible connection 20 is connected to the inner disk 24 and is adapted to be wound upon the rotatable sleeve between the disks 24 and 25, the said disk 24 acting as an abutment for the spring 26 and in connection with the other disk as a casing for the said flexible connection 20, while the flexible connection 21 is secured to the disk 25 and is adapted to be wound upon the opposite side thereof upon the rotatable sleeve. By this means when the sleeve is rotated to control the friction of the brake-shoe upon the brake plate or disk the indicator is moved in the opposite direction to indicate the time in which the operating mechanism will operate the record as marked on the record. The spring 26 referred to is employed to hold the rotatable sleeve in its adjusted position, so that the movement of the brake thereon will at no time cause the same to be moved, and thereby change the time or speed of the record.

From the foregoing description, taken in connection with the drawings, the operation of my speed and time controlling and indicating mechanism is readily understood; but briefly stated it is as follows: As the time at which the sound or music should be reproduced is printed or affixed upon the record, all that is necessary to do after the record has been placed upon the record-support is to rotate the sleeve 7 so that the pointer controlled thereby will be opposite the proper time-indicating numerals upon the music-scale, which is the same as on the record. This movement will regulate the distance or friction between the brake-disk 1 and brake-shoe 2 so that when the starting or stopping pin 10 is operated to be released from the spring-plate 5 of the brake the governor mechanism is released to the proper degree so as to allow the operating mechanism to rotate the disk, the brake at this point causing enough friction between its shoe and plate to regulate the speed of the rotation or revolution of the record, so that it will be reproduced in the exact time that it was recorded, such time continuing from the outset until the record has been entirely reproduced, thus overcoming the objection to having to start the machine and regulate the speed and time while the same is in motion, as the speed and time with my mechanism is set at the very beginning or before the operating mechanism is set in motion. It will thus be seen that when the spring 5 is in contact with the push-pin 10 the brake disk and shoe are in close proximity, so that the brake-disk is held from revolving, and that when the push-pin 10 is released from the spring the brake-shoe is released from the disk to allow the same to revolve, the rotatable sleeve at this point abutting against the lug 6 to hold the brake-shoe against the disk to produce the proper friction between the parts, thereby allowing the record to be revolved at the proper rate of speed.

What I claim as new, and desire to secure by Letters Patent, is—

1. In a sound-reproducing mechanism, the combination of an operating mechanism, a governor mechanism, a brake-disk carried thereby, a brake provided with a spring-plate adapted to coact with said disk, a slidably-mounted starting and stopping pin adapted to engage said spring-plate to control the operation of the governor, a rotatable sleeve surrounding the said pin and adapted to control the movement of the brake to regulate the speed of the governor after the mechanism has been set in operation, and an indicating device operably connected with said rotatable sleeve, consisting of a pointer adapted to be oscillated so as to be observable from the outside of the machine, and flexible connections connected to said pointer and rotatable sleeve for operating the pointer simultaneously with the operation of the sleeve.

2. In a sound-reproducing mechanism, the combination of an operating mechanism therefor, a speed-regulating device therefor, and a time and speed indicating mechanism consisting of a horizontally-movable pointer observable from the outside of the machine, and flexible connections between the pointer and speed-regulating device for controlling the movement of the pointer.

3. In a sound-reproducing mechanism, the combination of a casing having a lid with an elongated slot therethrough, an operating mechanism, a speed and time determining mechanism operably connected with said operating mechanism and an indicating mechanism controllable by the speed and time determining mechanism consisting of a pointer projecting through said slot of the lid, and flexible connections connected to said pointer below the lid and speed and time determining mechanism so that the pointer is operated simultaneously with said mechanism.

4. In combination with a sound-reproducing mechanism, of a casing having a slot through the lid thereof, an operating mechanism, means for starting and stopping said mechanism, a speed and time controlling mechanism adapted to operate independently of the stopping and starting mechanism, and an indicating mechanism controlled by the speed and time mechanism consisting of a pointer slidably mounted within the slot and observable from the exterior of the machine, a pair of guides secured upon the under side of the top and below said slot, a block connected with the pointer and slidably mounted with relation to said guides, and means connected to said block and the speed and time regulating or determining mechanism for simultaneously operating said pointer.

5. In combination with a sound-reproducing mechanism, of a casing having a slot through the lid thereof, an operating mechanism, means for starting and stopping the mechanism, a speed and time controlling mechanism adapted to operate independently of the stopping and starting mechanism, and an indicating mechanism controlled by the speed and time mechanism, consisting of a pointer slidably mounted within the slot and observable from the exterior of the casing, a pair of guides secured upon the under side of the top and below said slot, a block connected with the pointer and slidably mounted with relation to said guides and flexible connections connected to said block and to the speed and time determining mechanism.

6. In a sound-reproducing machine, the combination of an operating mechanism, a governor mechanism, a pivoted lever carrying a brake, a spring-plate and a stop; a slidingly-mounted stopping and starting pin adapted to engage said spring-plate to control the lever, a rotatable sleeve surrounding the pin adapted to have its end engage the stop to regulate the friction between the brake and the governor mechanism to control the speed thereof, an indicator, and flexible connections operably connected with said indicator and the sleeve for controlling the movement of the indicator and the sleeve.

7. In a sound-reproducing machine, the combination of an operating mechanism, a governor mechanism, a pivoted lever carrying a brake, a spring-plate and a stop; a slidingly-mounted stopping and starting pin adapted to engage said spring-plate to control the lever, a rotatable sleeve surrounding the pin adapted to have its end engage the stop to regulate the friction between the brake and the governor mechanism to control the speed thereof, a pair of disks mounted on said sleeve, an indicator, and means for controlling the movement of the indicator connected to the disks of the sleeve.

8. In a sound-reproducing machine, the combination of an operating mechanism, a governor mechanism, a pivoted lever carrying a brake, a spring, and a stop; a slidingly-mounted stopping and starting pin adapted to engage said spring-plate to control the lever, a rotatable sleeve surrounding the pin, a pair of disks carried by the sleeve, an indicator, and a flexible connection connected to each disk and to the opposite sides of the indicator for controlling the movement of the indicator.

9. In combination with a sound-reproducing machine having a casing with a slot through the lid thereof and with an operating, stopping and starting, governor, and speed-controlling mechanisms, of a time and speed indicating mechanism therefor, comprising a scale located exteriorly of the casing to one side of the slot, a pointer adapted to slide longitudinally in said slot, a block connected to said pointer, flexible connections connected to said block, and disks operably connected to said speed-controlling mechanism and to the opposite ends of the flexible connections for controlling the pointer.

10. In combination with a sound-reproducing machine having a casing with a slot through the lid thereof and with an operating, stopping and starting, governor and speed-controlling mechanisms, of a time and speed indicating mechanism therefor, comprising a scale located exteriorly of the casing and to one side of the slot, a pointer adapted to slide longitudinally in said slot, a block connected to said pointer, flexible connections connected to said block, and means operably connected to said speed-controlling mechanism and to the opposite ends of the flexible connections for controlling the pointer.

In testimony whereof I affix my signature in presence of two witnesses.

EDWARD BERNARD FINCH.

Witnesses:
T. BLAIR SHOEMAKER,
PHILIP S. McLEAN.